United States Patent [19]

Druyvesteyn et al.

[11] 3,930,242

[45] Dec. 30, 1975

[54] MAGNETIC DEVICE HAVING DOMAINS

[75] Inventors: Willem Frederik Druyvesteyn; Jan Willem Frederik Dorleijn, both of Eindhoven, Netherlands

[73] Assignee: U.S. Philips Corporation, New York, N.Y.

[22] Filed: Mar. 13, 1974

[21] Appl. No.: 450,741

[30] Foreign Application Priority Data

Mar. 13, 1973 Netherlands ....................... 7303465

[52] U.S. Cl. ............................................ 340/174 TF

[51] Int. Cl.² ........................................... G11C 11/14

[58] Field of Search ............................... 340/174 TF

[56] References Cited

UNITED STATES PATENTS

| | | | |
|---|---|---|---|
| 3,602,911 | 8/1971 | Kurtzig | 340/174 TF |
| 3,786,447 | 1/1974 | Yamauchi | 340/174 TF |

OTHER PUBLICATIONS

IBM Technical Disclosure Bulletin-Vol. 13; No. 10, Mar. 1971 pg. 3064 & 3065.

IEEE Transactions on Magnetics, Vol. Mag.-J, No. 3, Sept. 1969 pg. 554–557.

*Primary Examiner*—James W. Moffitt
*Attorney, Agent, or Firm*—Frank R. Trifari; Carl P. Steinhauser

[57] ABSTRACT

Magnetic device comprising at least one thin layer of a magnetisable material which has a preferred direction of magnetisation substantially at right angles to the surface of the layer and domain positioning structure. In the layer magnetic domains are maintained, moved, and annihilated by magnetic fields one of which is situated substantially in the plane of the layer and does not change direction and under the influence of which the domains are moved parallel to the axis of the magnetic field.

2 Claims, 9 Drawing Figures

MAGNETIC DEVICE HAVING DOMAINS

The invention relates to a magnetic device comprising at least one thin layer of a magnetisable material having a preferred direction of magnetisation which is substantially at right angles to the surface of the layer, further comprising means for maintaining and possibly annihilating magnetic domains in this layer, and furthermore comprising means for moving the domains.

The rare earth and yttrium orthoferrites and certain ferrites of garnet structure are examples of materials suitable for this purpose. The materials have a preferred direction of magnetisation owing to their uniaxial anisotropy. This uniaxial anisotropy may be characterized by what is generally referred to as a uniaxial anisotropy field. As a means of maintaining and possibly annihilating the magnetic domains in platelets of the said materials an external magnetic field $H_0$ is used the direction of which coincides at least substantially with the said preferred direction of magnetisation of the platelet. The magnetic domains may, for example, be circular-cylindrical and can only exist in a stable form in the case of magnetic fields $H_0$ the strength of which lies between given limits. These limiting values of the field depend inter alia upon the thickness of the platelet in which the domains occur and upon its chemical composition. The domains may alternatively be annular or strip-shaped.

Various suggestions have been made to enable such domains to be utilized. In many cases it is of importance that at a given instant a domain occupies a fixed position in the layer and subsequently is moved to another fixed position under the influence of certain driving forces. It is known to produce these driving forces with the use of a magnetic field, an electric current or light by means of domain guide structures provided on the layer. In such method the direction of movement of the domains is initially determined by the shape of the domain guide structures. Depending upon the shape of the domain guide structures, for example either a magnetic field which rotates in the plane of the layer or a magnetic field which varies in a direction at right angles to the plane of the field may be used.

A disadvantage of these known devices is that the direction of movement of the domains is determined by the shape of the domain guide structures so that the domains can move in a platelet in given directions only.

According to the invention the layer is provided with a domain positioning structure while in addition means are provided for producing a magnetic field which is situated substantially in the plane of the layer and does not change direction, in order to move in certain places of the layer a domain parallel to the axis of the magnetic field from a first part of the domain positioning structure to a second part of the domain positioning structure. The term "domain positioning structure" is used herein to mean a structure which initially determines the fixed positions in the layer which the domains may occupy. In this case the direction of movement of given domains is determined by the direction of the magnetic field, so that in comparison with the known devices a far greater freedom in the movement of the domains is obtained.

The value of the magnetic field in the plane of the layer which is required to move the domains depends upon the value of the uniaxial anisotropy field; it is about 0.1 to 0.8 times this field. To enable simply obtainable magnetic fields to be used the value of the uniaxial anisotropy field $H_k$ of the magnetisable material preferably is less than 300 oersted.

The value of the magnetic field in the plane of the layer determines the size of a domain and in certain cases its shape also. This is utilized, for example in co-operation with the domain positioning structure, in moving the domains. If because of the domain positioning structure a plurality of directions of movement are possible for a given domain, the field determines in which of these directions the domain will move. In known devices in which because of a structure provided on the layer a plurality of directions of movement are possible, moving a domain always requires not only a magnetic field but also additional means for determining the direction of the movement. However, owing to their permanent nature such additional means, for example current loops, restrict the freedom in respect of the direction of movement. In another case the sense of rotation of the rotating field serving to the propagation is used for this purpose, but this is only possible with a given construction of the domain guide structure. In the device according to the invention the sense of rotation of the rotating field remains unchanged.

Embodiments of the invention will now be described, by way of example, with reference to the accompanying diagrammatic drawings, in which.

Figure 1:
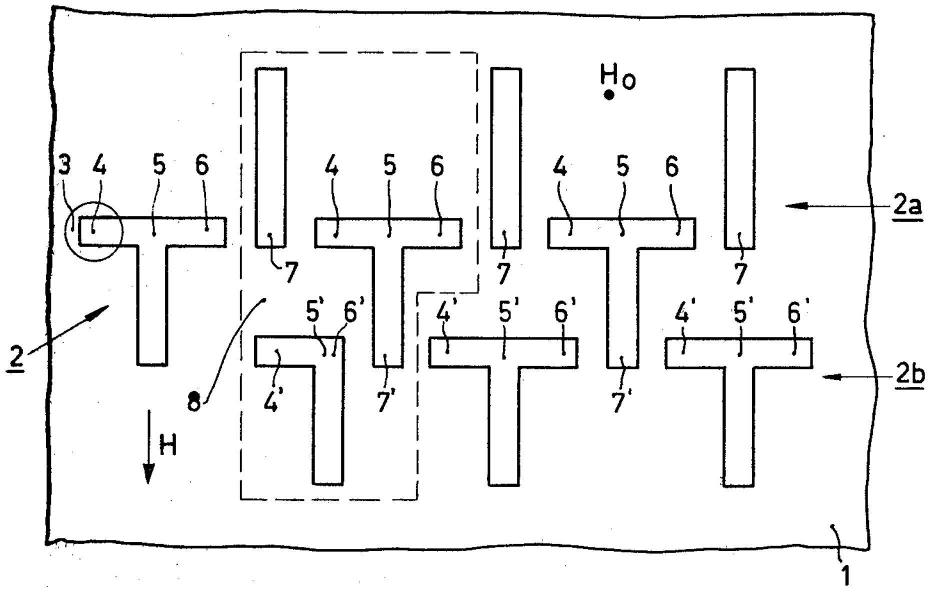
FIG. 1 shows a magnetic device having a given domain guide structure.
Figure 6:
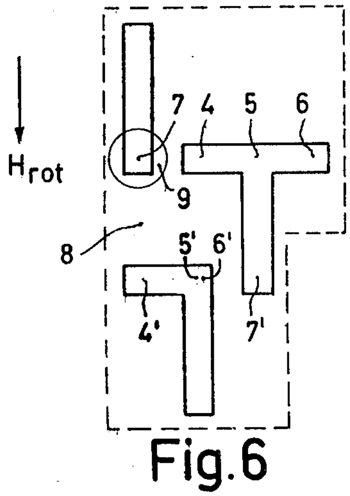
Figure 7:
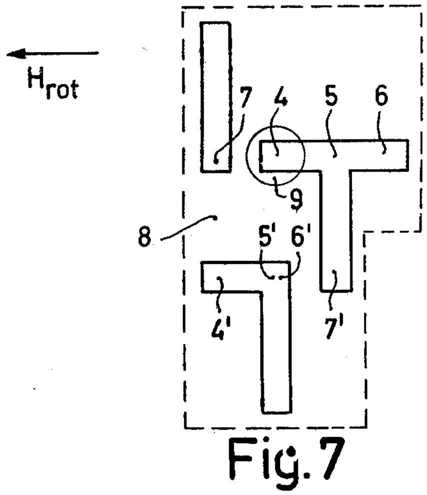
Figure 8:
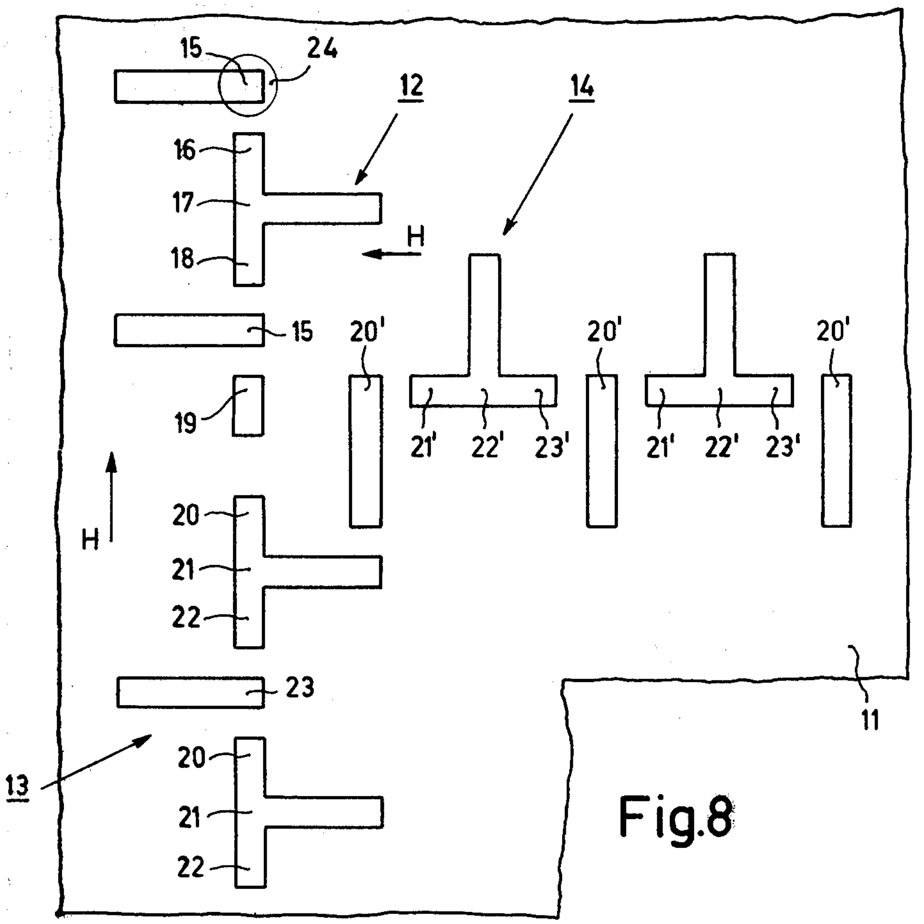

FIGS. 6 and 7 also show this part of the device of FIG. 1,

FIG. 8 shows a magnetic device having another domain guide structure and

Figure 9:
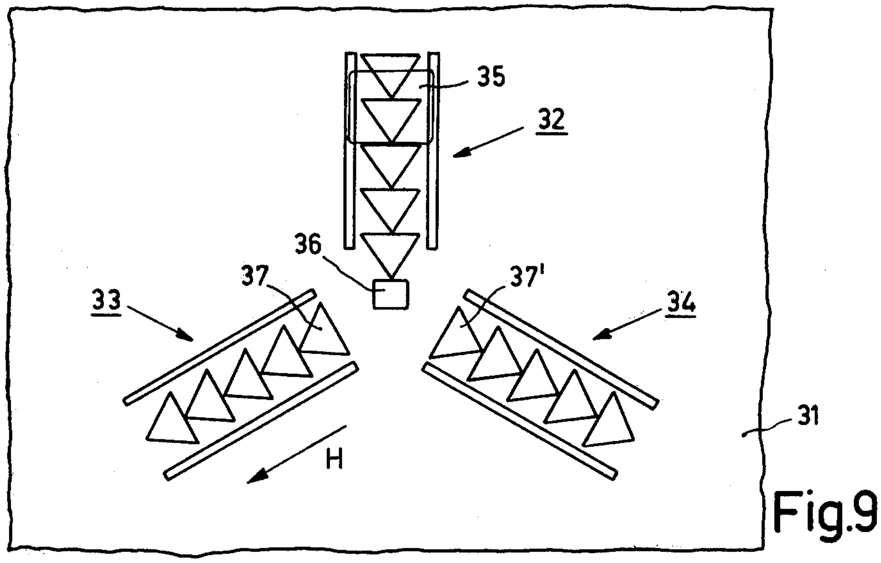

FIG. 9 shows a magnetic device having still another domain guide structure.

Figure 2:
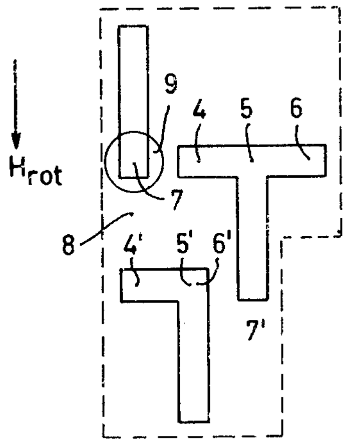
FIGS. 2, 3, 4 and 5 show a given part of the device of FIG. 1.
Figure 5:
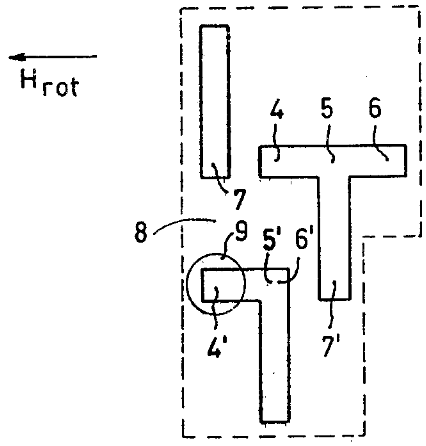
Figure 3:
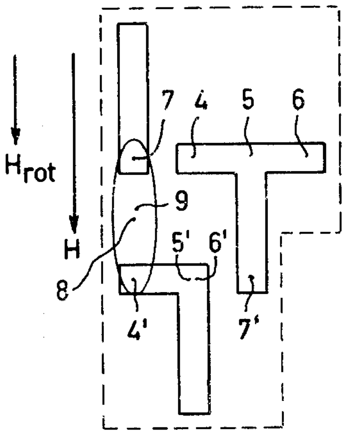
Figure 4:
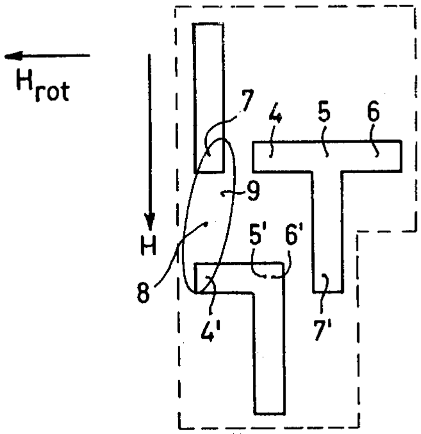

Referring now to FIG. 1, a part of a platelet 1 of magnetisable material carries a T-bar structure 2 of permalloy which comprises a T-bar structure 2*a* poles 4, 5, 6 and 7, and a T-bar structure 2*b* having poles 4', 5', 6' and 7' and arranged parallel to part of the first-mentioned structure. By means of a magnetic field $H_{rot}$ which rotates in the plane of the platelet 1 (this field is produced by a device not shown) a magnetic domain 3 is displaceable along the structure 2*a* along the poles 4, 5, 6, 7, 4, 5, . . . At a given instant a domain 9 shown in FIG. 2, which FIG. also shows the direction and the value of the field $H_{rot}$, is located on the pole 7 at 8. When an additional magnetic field H, which is produced by a device, not shown, and is directed from the said pole 7 to the adjacent pole 4' in the structure 2*b*, is applied the domain 9 is extended from the pole 7 to the pole 4' (see FIG. 3). The field H is applied until the field $H_{rot}$ has rotated 90°, which rotation causes the shape of the domain 9 to be slightly changed (see FIG. 4). Then the field H is switched off and the domain 9 is located on the said pole 4' (see FIG. 5). Subsequently the domain is displaced further under the influence of the field $H_{rot}$ along the poles 5', 6', 7', 4', 5', . . . of the structure 2*b*. If at the instant at which a domain is located on the pole 7 and 8 no additional magnetic field is applied which is directed from this pole 7 to the adjacent pole 4' in the structure 2*b*, the domain under the influence of the field $H_{rot}$ is displaced along the poles 4, 5, 6, 7, 4, 5, . . . of the structure 2*a*. This is shown in FIGS. 6 and 7, FIG. 6 corresponding to the situation shown in FIG. 2 and 3, while FIG. 7 corresponds to that shown in FIGS. 4 and 5. The two poles 4 and 4' situated near the pole 7 at 8 each determine a fixed position which the domains can occupy, and under the influence of the said field in the plane of the platelet a domain is moved from the structure 2*a* to the structure 2*b*. In a given case the platelet is made of $Y_{2.6}Gd_{0.3}Pb_{0.1}Fe_{3.8}Ga_{1.2}O_{12}$ and is 6/μm thick. It has a uniaxial anisotropy field of 915 oersted, the saturation magnetisation being 24 gauss. The value of the field $H_o$ for maintaining the domains is 200 oersted and that of the field $H_{rot}$ is 20 oersted. The movement of a domain from the structure 2*a* to the structure 2*b* is effected by a field of 180 oersted. In another case the platelet is made of $Y_{2.68}Gd_{0.32}Fe_{4.08}Ga_{0.92}O_1$ and is 8/μm thick. It has a uniaxial anisotropy field of 183 oersted, the saturation magnetisation being 22.2 gauss. The value of the field $H_o$ is 210 oersted and that of the field $H_{rot}$ is 20 oersted. The movement of a domain from the structure 2*a* to the structure 2*b* is effected by a field of 54 oersted.

FIG. 8 shows part of a platelet 11 which is made of a magnetisable material and which carries T-bar structures 12, 13 and 14 of permalloy. The T-bar structure 12 comprises poles 15, 16, 17 and 18; the T-bar structure 13 comprises poles 20, 21, 22 and 23; the Tbar structure 14 comprises poles 20', 21', 22' and 23'. In addition a permalloy rectangle 19 is provided. By means of a magnetic field $H_{rot}$ which is produced by a device, not shown, and rotates in the plane of the sheet 11 a magnetic domain 24 is displaceable along the structure 12 along poles 15, 16, 17, 18, 15. The domain then moves to the permalloy rectangle 19, but further displacement is not possible by means of the field $H_{rot}$. If an additional magnetic field, which is produced by a device, not shown, and is directed from the structure 13 to the rectangle 19, is applied, the domain extends to the pole 20. The additional field is then switched off and the domain is displaced to the pole 20 and then, under the influence of the field $H_{rot}$, it moves further along the structure 13 along the pools 21, 22, 23, 20, 21, . . . However, if at the instant at which the domain is located on the rectangle 19 an additional magnetic field, which is produced by a device, not shown, and is directed from the structure 14 to the rectangle 19, is applied, the domain extends to the pole 20'. The additional field then is switched off and the domain is displaced to the pole 20' and then, under the influence of the field $H_{rot}$, it moves further along the structure 14 along the poles 21', 22', 23', 20', 21', . . . The two poles 20 and 20' which lie near the rectangle 19 each determine a fixed position which a domain can occupy, and under the influence of a magnetic field situated in the plane of the platelet 11 a domain moves from the rectangle 19 either to the pole 20 or to the pole 20'.

FIG. 9 shows part of a platelet 31 which is made of a magnetisable material and carries angelfish structures 32, 33 and 34 made of permalloy. A magnetic field which varies at right angles to the plane of the platelet 31 will cause a magnetic domain 35 to move along the structure 32 to the rectangle 36; however, further displacement by means of this magnetic field is not possible. If an additional magnetic field, which is produced by a device, not shown, and is directed from the rectangle 36 to the structure 33, is applied, the domain extends to the pole 37. The additional field is then switched off and the domain is displaced to 37 and then continues to move along the structure 33 under the influence of the varying magnetic field. However, if at the instant at which the domain is located on the rectangle 36 an additional magnetic field, which is produced by a device, not shown, and is directed from the rectangle 36 to the structure 34, is applied, the domain extends to 37'. The additional field is then switched off and the domain is displaced to 37', and then continues to move along the structure 34 under the influence of the varying magnetic field. The triangles 37 and 37' each determine a fixed position which a domain may occupy, and under the influence of a magnetic field situated in the plane of the platelet 31 a domain moves from the rectangle 36 either to the triangle 37 or to the triangle 37'.

What is claimed is:

1. Magnetic device comprising at least one thin layer of a magnetisable material having a uniaxial anisotropy field and preferred direction of magnetisation which is substantially at right angles to the surface of the layer, means for maintaining magnetic domains in said layer, means for moving the domains, a domain positioning structure having first and second parts, and means for producing a uni-directional magnetic field of constant solarity substantially in the plane of the layer for moving a domain parallel to the axis of said magnetic field from the first part of the domain positioning structure to the second part of the domain positioning structure.

2. Magnetic device as claimed in claim 1, wherein the value of the uniaxial anisotropy field $H_k$ of the magnetisable material is less then 300 oersted.

* * * * *